Patented Nov. 10, 1953

2,658,923

UNITED STATES PATENT OFFICE 2,658,923

STABILIZED OXO ALCOHOLS

Wilbur F. Fischer, Roselle Park, N. J., assignor to Standard Oil Development Company, a corporation of Delaware No Drawing. Application June 21, 1950,
Serial No. 169,539

2 Claims. (Cl. 260—632.5)

This invention relates to improvements in stabilizing certain branched chain synthetic alcohols. More particularly, this invention relates to the stabilization of these and especially Oxo alcohols through the use of small amounts of particular bisphenols and especially diphenylol propane.

Synthetic Oxo alcohol products produced by the well-known Oxo process (see e. g. U. S. Patent 2,327,066 and U. S. Bureau of Mines Publication R1 4270, "Critical Review of Chemistry of the Oxo Synthetic, etc.," 1948) have come into commercial use in the production of esters suitable for plasticizers, by reaction with both aliphatic and aromatic acids or anhydrides including such examples as phthalic acid, maleic acid, adipic acid, and also phthalic and maleic acid anhydrides. Certain of the synthetic alcohols prepared by the oxonation and hydrogenation reaction are known to be especially suitable for the manufacture of ester plasticizers and particularly for use in clear plastics. These include alcohols of from $C_4$ to $C_{13}$ range such as the butyl alcohols, the octanols, and the nonanols. It has recently been learned that synthetic alcohols of the $C_8$ series and particularly those chosen from the iso-octyl type are among the best type of esterification alcohols to prepare plasticizers.

It is essential that these esters have good color stability and weathering characteristics and it is consequently necessary that the alcohols themselves employed in the esterification reaction have good color stability in storage. This latter criterion is difficult of realization however, because the synthetic alcohols usually exhibit relatively poor storage stability as evidenced by a changing of color from colorless to yellow, or even darker, and by a large increase in the peroxide number. Both of these deteriorative changes render the alcohol unsuitable for use. These undesirable characteristics including the color are believed to be caused by impurities present in the synthetic alcohol product and particularly by the sulfur products present in the alcohol, although other impurity materials can also affect the color including polymerized and condensed higher molecular weight impurities as well as unreduced carbonyl compounds, unsaturated organic compounds such as ethers and carbonyl compounds and other non-alcoholic compounds.

It has now been found that these difficulties of the synthetic Oxo alcohol are completely overcome by the addition of small amounts of specific bisphenol type stabilizers to these alcohols. The new stabilizers used in the present invention are bisphenol compounds having the formula

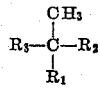

wherein $R_1$ is an alkyl radical of 1 to 4 carbon atoms, and $R_2$ and $R_3$ are hydroxyphenyl groups, preferably para-hydroxyphenyl. Such compounds can be obtained by condensing in a known manner two mols of a simple or a chlorine-substituted phenol with one mol of a ketone such as acetone, methyl ethyl ketone, methyl n-butyl ketone or methyl isobutyl ketone. The preferred stabilizer of this class is 2,2-di-(p-hydroxyphenyl)-propane, also referred to herein as diphenylol propane.

2,2-di-(p-hydroxyphenyl) propane, hereafter referred to simply as diphenylol propane, has been tried previously as an anti-oxidant for various hydrocarbon materials such as wax, natural rubber, and hydrocarbon polymers of other kinds. However, in all of the previous trials diphenylol propane proved to be generally inferior to other types of known anti-oxidants and for this reason its use as anti-oxidant never was commercially adopted by the art. In fact, the only major commercial outlet for diphenylol propane is understood to be in the field of chicken farming wherein it is used to control coccidiosis or protozean infestation of poultry.

Despite the previous failures, the surprising discovery has now been made that this bisphenol compound obtained by the condensation of phenol with acetone and having the formula

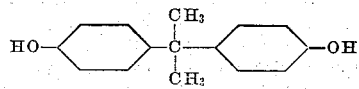

has a specific stabilizing effect on synthetic Oxo alcohols and particularly on the $C_8$ product known as iso-octyl alcohol. The efficacy of diphenylol propane and the fact that it does not impart any color to the alcohol makes it superior to other phenolic type substances.

The alcohol mixtures to be stabilized are best obtained by the Oxo process. The term "Oxo" process is well-understood in the art as referring to a process wherein an olefin feed is first reacted or "oxonated" with carbon monoxide and hydrogen at a temperature between about 120° C. and 205° C., and under a pressure of about 150 to 400 atmospheres in the presence of a cobalt or similar catalyst, generally introduced in the form of a fatty acid salt, to form aldehydes in accordance with the following reaction:

$$C_nH_{2n} + CO + H_2 \rightarrow C_nH_{2(n+1)}CHO$$

The aldehydes so formed are then catalytically hydrogenated to form the desired alcohols as follows:

$$C_nH_{2(n+1)}CHO + H_2 \rightarrow C_nH_{2(n+1)}CH_2OH$$

The preferred hydrogenation catalysts are those of the sulfur sensitive nickel type though other known hydrogenation catalysts such as the sulfides of nickel, molybdenum and cobalt, with or without support on carbon, silica, etc., can also be used, especially where a rugged sulfur-insensitive catalyst is desired.

The overall carbonylation or so-called Oxo reaction as outlined above, provides a particularly effective method for preparing valuable primary alcohols, particularly of the $C_4$ to $C_{13}$ range, which find large markets as intermediates for detergents and plasticizers. The $C_7$ through $C_9$ Oxo alcohol products are especially preferred for use in forming esters to be used as plasticizers in light-colored or colorless plastics and resins.

The most readily available olefinic feed stocks for the Oxo reaction as outlined above are selected hydrocarbon streams derived from petroleum refinery sources.

In connection with the Oxo reaction of olefin hydrocarbons, it has been found convenient to classify the various olefins into five fundamental types according to the character of carbon atoms linked by the olefinic bonds. These five types are as follows:

Type I
$$CH_2=CHR$$

Type II
$$RCH=CHR$$

Type III
$$CH_2=C\begin{matrix}R\\R\end{matrix}$$

Type IV
$$RCH=C\begin{matrix}R\\R\end{matrix}$$

Type V
$$\begin{matrix}R\\R\end{matrix}C=C\begin{matrix}R\\R\end{matrix}$$

In the above formulas R represents a straight or a branched chain alkyl group, it being understood that where more than one symbol R appears in a formula, the several R symbols may represent the same alkyl group or different alkyl groups. Under this classification, for example, butene-1, 3-ethyl pentene-1, or 4,4-dimethyl pentene-1 are Type I olefins; butene-2, 4,4-dimethyl pentene-2, 2-methyl 5-ethyl hexene-3 are Type II olefins; 2,3,3-trimethyl butene-1 is a Type III olefin; 2,4-dimethyl pentene-2 is a Type IV olefin; tetramethyl ethylene is a Type V olefin, and so forth.

In the Oxo reactions, generally there is no invariable point of attack on the olefinic double bond such as one might predict from Markownikoff's rule, and thus in the case of Type I olefins of the formula $H_2C=CHCH_2R$ approximately equal amounts of both 1-substituted alcohols of the formula $CH_2OH.CH_2.CH_2.CH_2R$ and 2-substituted alcohols of the formula $$CH_3.CH(CH_2OH).CH_2R$$

are formed, with the 1-position being slightly favored. It is thus apparent that the Oxo process is inherently committed to the production of at least some branched-chain primary alcohols even when the starting material is a pure Type I straight-chain olefin. Type V olefins are usually incapable of oxonation. The oxonation feed may contain mono-olefins of any type and suitable olefinic feeds may be fractionated, for example, from cracked gases, from Fischer-Tropsch synthesis products or from a polymerized stream of $C_3$ to $C_5$ olefins.

The alcohols formed by oxonation of the olefinic materials described above are naturally quite complex in character and the exact composition of many of these products is not known. The $C_8$ Oxo alcohols obtained have thus been found to comprise a mixture of isomers.

Studies have been carried out to elucidate experimentally the structural composition of these iso-octyl alcohol isomers. The combined techniques of cracking the stearic acid ester, analyzing the resulting olefins for type by infra-red, hydrogenating, and analyzing the resulting paraffins for individual components have been employed. Several conclusions can be drawn:

1. The isomers present comprise predominantly those having five and six carbon atoms in the longest straight chain.

2. To the extent of at least 85%, and probably 95%, or more, there are no alkyl groups in the 2-position.

3. Of the possible 5% having one alkyl group in the 2-position, not more than about 1% based on the total alcohol, could be 2-ethylhexanol.

4. Not more than 10% (perhaps none) have 2-alkyl groups in the 2-position.

5. Of the eleven possible isomers qualifying under (3) above, two cannot be formed through oxonation, and three are highly improbable on the basis of available compositional data on $C_7$ polypropylene. The number of likely principal isomers is thus reduced to five.

The high Type I assay and the boiling range of the olefins derived from iso-octyl alcohol, together with a priori exclusion of 3,3-dialkylated alcohols as products of oxonation, limit the number of possible major constituents of iso-octyl alcohol to nine isomers. On the basis of the best available data only four or five of these alcohols could be formed in substantial amounts, the first three predominating.

| Alcohol | Major Constituents of Typical Iso-Octyl Alcohol | |
|---|---|---|
| | B. P., °C. of Alcohol | Percent on Total |
| 4,5-dimethyl hexanol | | 26 |
| 3,5-dimethyl hexanol | 176 | 30 |
| 3,4-dimethyl hexanol | | 18 |
| 3 and/or 5-methylheptanol | 185.8–186.5 | 17 |
| Miscellaneous and unidentified | | 9 |
| | | 100 |

Typical commercial iso-octyl alcohol also may contain up to about 15% of $C_7$ and lower alcohols and up to about 15% of $C_9$ alcohols.

One typical iso-octyl alcohol mixture has been found to have the following characteristics:

Hydroxyl No. 429
Carbonyl No. 1
Saponification No. <1
Acid No. <0.001

A. S. T. M. distillation:

| | °C. |
|---|---|
| 5% | 175.3 |
| 50% | 183.3 |
| 95% | 188.3 |
| Final | 202.7 |

(Recovery 99.0%)

Alcohol purity $$\left(\frac{\text{Hydroxyl No.}}{\text{Theor. Hydroxyl No. (431)}} \times 100\right) = 99.5\%$$

and kinematic viscosity at 68° F. of 12.4–12.8 centistokes. In general, it is desirable that the kinematic viscosity of the alcohol be between about 12.0 and 13.0 centistokes at 68° F.

The following example illustrates the stabilizing effect of diphenylol propane on an iso-octyl alcohol product having the major constituents and properties described above.

EXAMPLE

In this test 100 cc. of the alcohol were exposed to 125 p. s. i. of oxygen pressure for 24 hours at 100° C. Data are presented below:

*Stability in an accelerated storage test iso-octyl alcohol*

| Sample No | 1 | 2 |
|---|---|---|
| Stabilizer | None | 0.25 wt. percent diphenylol propane. |
| Peroxide Content Before Testing, p. p. m. | 16.0 | 16.0 |
| Peroxide Content After Testing, p. p. m. | 940 | 17.8 |
| Decrease in O₂ pressure in 24 hrs. p. s. i. | 34.0 | 7.0 |
| Original Color—Visual | Colorless | Colorless |
| Percent Light Transmission—Orig. Diller | 88.2 | 88.2 |

It should be noted that whereas the control iso-octyl alcohol sample exhibited almost a 60-fold increase in peroxide number, the sample containing the added stabilizer exhibited almost no increase in peroxide number.

This example illustrates the manner in which the crude or partly purified alcohols may be benefited during the course of accelerated temperature purifying and processing treatment such as distillation.

In general, the amount of diphenylol propane added to Oxo alcohol lies in the range of 0.02 to 4.0 weight per cent and preferably 0.03 to 0.5 weight per cent based on the alcohol.

While other bisphenols may be employed as stabilizers for the Oxo alcohols, they usually give somewhat inferior results. On the other hand, alkylated phenol sulfide and alkylated polyhydroxy phenol products known respectively as Santowhite and Santovar A and widely used as non-discoloring stabilizers, color the Oxo alcohols undesirably.

Diphenylol propane can also be employed to stabilize the more linear alcohols especially other $C_8$ alcohols, but the improvement on these is not as marked as with the Oxo more-branched alcohols.

Among the advantages accruing to the use of diphenylol propane for the stabilizing of Oxo alcohols are its low cost, potency, and non-coloring characteristics.

A particular advantage in the use of diphenylol propane resides in the fact that because of its low volatility and compatibility, it remains in the iso-octyl alcohol during the esterification with phthalic acid and other acids and is thus then found in the resultant esters and results in the stabilization of the latter.

It will be understood further that the foregoing example has been given merely for purposes of illustration, but that other modifications of the present invention are possible without departing from the scope of the appended claims.

What is claimed is:

1. A composition of matter comprising a mixture of alcohols prepared by the Oxo process, said mixture of alcohols comprising essentially as the major constituents 4,5-dimethyl hexanol, 3,5-dimethyl hexanol, 3,4-dimethyl hexanol, 3-methyl heptanol, 5-methyl heptanol, and a minor amount of diphenylol propane.

2. A composition as in claim 1 in which the diphenylol propane is present in an amount of 0.03 to 0.5 weight per cent based on the mixture of alcohols.

WILBUR F. FISCHER.

References Cited in the file of this patent

UNITED STATES PATENTS

| Number | Name | Date |
|---|---|---|
| 1,989,788 | Calcott et al. | Feb. 5, 1935 |
| 2,061,779 | Semon | Nov. 24, 1936 |
| 2,270,959 | Murke et al. | Jan. 27, 1942 |
| 2,295,985 | Baird et al. | Sept. 15, 1942 |
| 2,542,972 | Thompson | Feb. 27, 1951 |
| 2,593,428 | Fischer et al. | Apr. 22, 1952 |

OTHER REFERENCES

Morawetz, Phenolic Antioxidants for Paraffinic Materials, Ind. Eng. Chem., vol. 41, No. 7, pages 1442–1447 (July 1949).